Jan. 1, 1952     E. F. BURTON ET AL     2,581,320
MULTIENGINE CONTRA-ROTATING PROPELLER DRIVE TRANSMISSION

Filed July 20, 1945     5 Sheets-Sheet 1

INVENTOR.
EDWARD F. BURTON
CHARLES S. GLASGOW JR.
BY Edwin Coates
ATTORNEY

Jan. 1, 1952     E. F. BURTON ET AL     2,581,320
MULTIENGINE CONTRA-ROTATING PROPELLER DRIVE TRANSMISSION
Filed July 20, 1945     5 Sheets-Sheet 2

INVENTOR.
EDWARD F. BURTON
CHARLES S. GLASGOW JR.
BY Edwin Coates
ATTORNEY

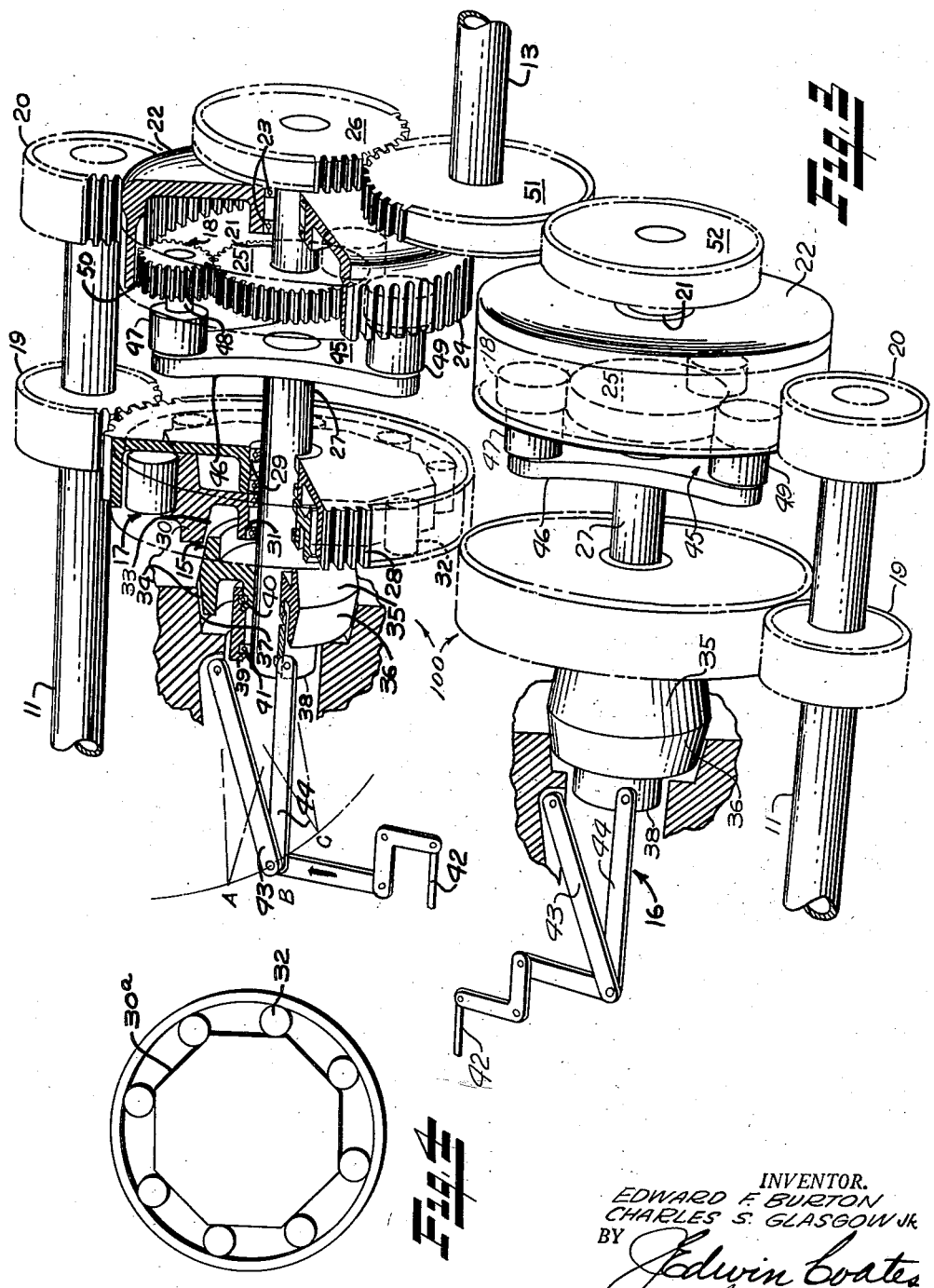

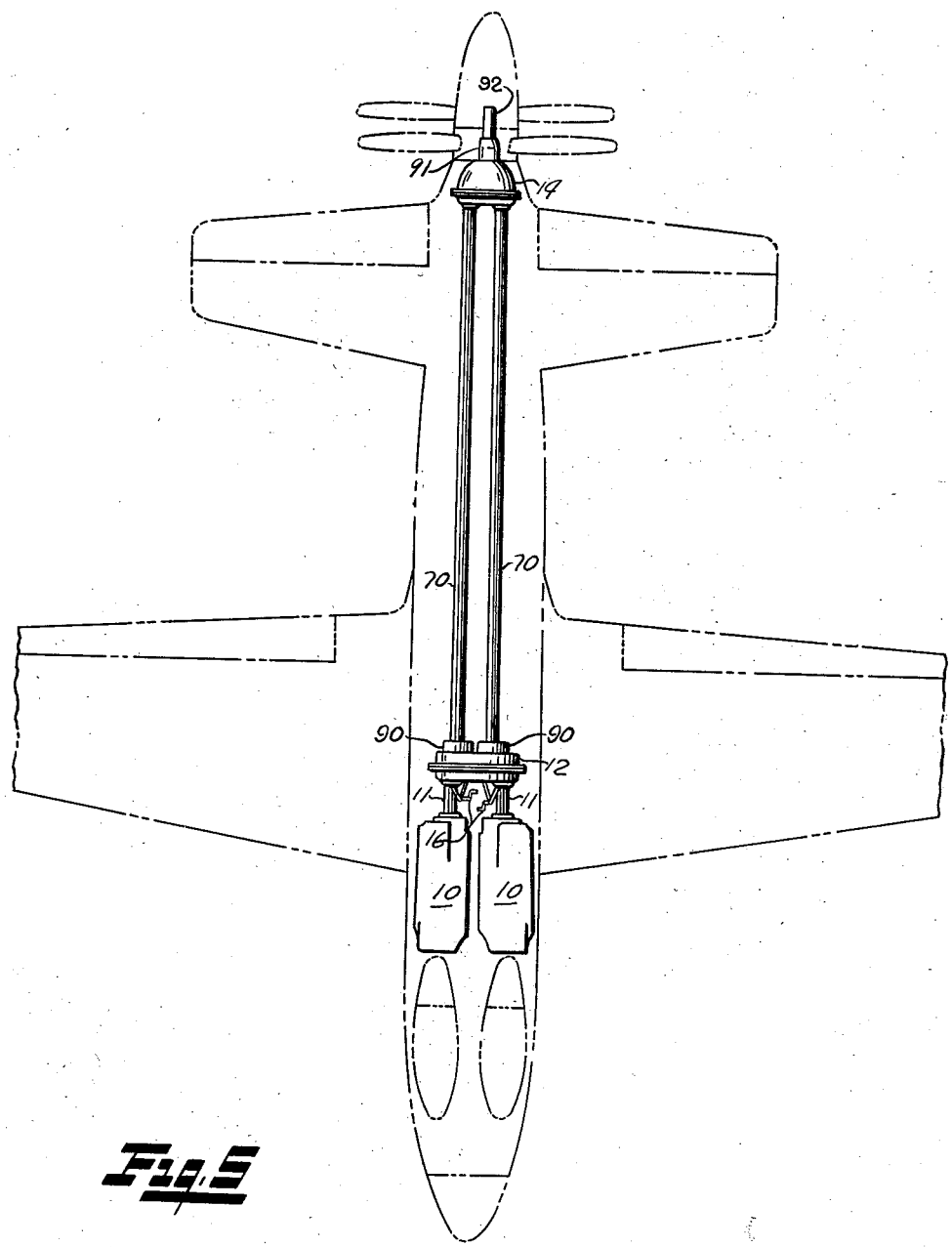

Patented Jan. 1, 1952

2,581,320

UNITED STATES PATENT OFFICE 2,581,320

MULTIENGINE CONTRA-ROTATING PROPELLER DRIVE TRANSMISSION

Edward F. Burton, West Los Angeles, and Charles S. Glasgow, Jr., Los Angeles, Calif., assignors to Douglas Aircraft Company, Inc., Santa Monica, Calif.

Application July 20, 1945, Serial No. 606,103

10 Claims. (Cl. 170—135.2)

This invention relates to power transmitting apparatus, and particularly to those for transmitting power from a plurality of prime movers to propelling means driven thereby. The invention is particularly adapted for use in high speed airplanes in which a plurality of engines drive either duel or coaxial contra-rotating propellers, located either in the nose or in the tail of the craft. By dual propellers is meant a pair of contra-rotating propellers mounted on separate shafts on a common axis, and driven oppositely in inter-dependent relationship from a single final reduction gearing. By coaxial propellers is meant a pair of contra-rotating propellers mounted on separate shafts having a common axis and driven oppositely in an independent manner by independent final reduction gearing. As will become apparent hereinafter, however, the invention is by no means limited in the scope of its utility to such environments.

In multi-engined aircraft of the present type, if all but one engine should fail during the performance of a mission, it is desirable to continue the flight and complete the mission on the remaining engine.

In prior airplanes propelled by contra-rotating propellers, vibrations are apt to be set up by such propellers, if they are not precisely synchronized. These vibrations can eventually reach a magnitude sufficient to cause severe pilot fatigue during an extended flight or possibly to cause failure of the airplane structure. Although these vibrations originate chiefly in the unsynchronized condition of the propellers, they can also be caused, or at least augmented, by out-of-phase relationships of the blade-passage pattern of the adjacent contra-rotating propellers.

In the high speed airplanes of the type to which the present invention is particularly adapted, the transmission of power from the engines to the propellers has heretofore been effected by means including reduction gearing having a fixed, invariable gear ratio. It has hence been obligatory to effect a compromise between the desired high speed performances of the airplane and the desired take-off performance thereof, in neither case achieving the optimum performance. In some cases, it has even been found necessary to elect one of these optimum performances, in preference to the other.

In multi-engine aircraft, if one engine or propeller should fail, especially on the take-off, it is imperative that the inoperative propeller should be prevented from being rotated by the air stream, or "windmilling," as the drag and a symmetrical yaw created thereby is highly disadvantageous in the operation of the craft. In the transmission systems of prior such airplanes, however, no such provision could practicably be made.

The present invention obviates these difficulties and provides an improved transmission system for high speed, multi-engine airplanes having contra-rotating propellers. The present transmission includes, among other things, means whereby the contra-rotating dual or coaxial propellers may be collectively or individually driven, by either or both of the engines; or conversely, whereby either or both engines may be selectively disengaged from the transmission. Hence, if one of the engines should fail, both or either of the propellers can be driven by the engine still operating. This feature of the invention is of outstanding value in enabling the continuation of flight and completion of a mission in case of failure of all the engines or propellers except one of each.

The transmission of the present invention also provides means whereby the engines, and consequently the propellers, can be precisely synchronized. The primary source of propeller vibrations is hence suppressed to such a degree as to obviate danger of structural failure or loss of control of the airplane.

The construction of the transmission is such that the rotation of either of the propellers may be terminated during flight and the propeller then feathered to eliminate its drag. The full feathered propeller produces little if any drag. It cannot be rotated by the air stream and hence does not "windmill," eliminating the destabilizing effect of a windmilling tractor type propeller.

Means are also provided whereby the blade passage pattern can be fixed with reference to the plane of symmetry of the airplane and whereby, if one propeller is removed from operation and then put back into service, it can be re-coupled in the transmission system with its blade passage pattern, with reference to that of the other propeller, identical with the pattern it had before.

Complemented by the exact synchronization of the engines, and consequently of the propellers, the foregoing feature substantially obviates the abovementioned propeller-induced vibrations.

The transmission of the present invention also includes variable reduction gearing of such a nature, and so located, that the speed or power reduction between the engines and the aft end of the transmission may be varied from one predetermined ratio to another. That is, for achieving optimum take-off transmission conditions, the speed of rotation of the transmission shaft can be increased and the transmitted torque reduced. Similarly, the torque transmitted to the propellers can be increased and the speed or angular velocity of the transmission shafts can be decreased, to achieve high speed flight after the craft is airborne.

A further feature of the invention resides in the fact that means are also provided for causing any engine, the revolutions of which happen to drop below the speed of the other engine or engines, to automatically overrun, or free-wheel, in the transmission system, whereby to obviate its braking effect upon the other engine.

The transmission of the present invention also includes means for enabling any engine to be started into operation by the operation of an engine that is already running.

Withal, the transmission system is of such a construction that the failure of any one component thereof, or of any one gear train, will not render the entire system inoperative or halt the flow of power to the propellers.

The presently preferred embodiments of the invention are illustrated in the accompanying drawings and described hereinafter in detail. It is to be understood, however, that the invention is limited in the embodiments which it can assume, only by the scope of the appended claims.

In these drawings:

Figure 3 is a perspective view of that portion of the transmission which is located in the gear box near the engine in Figures 1 and 2 respectively;

Figure 4 is a detailed end elevational view of the free-wheeling components of the transmission;

Figure 5 is a view similar to that of Figure 2, showing clutch means associated with the mean gear box for enabling individual disengagement of the propellers to permit feathering, etc., of the same.

Figure 1:
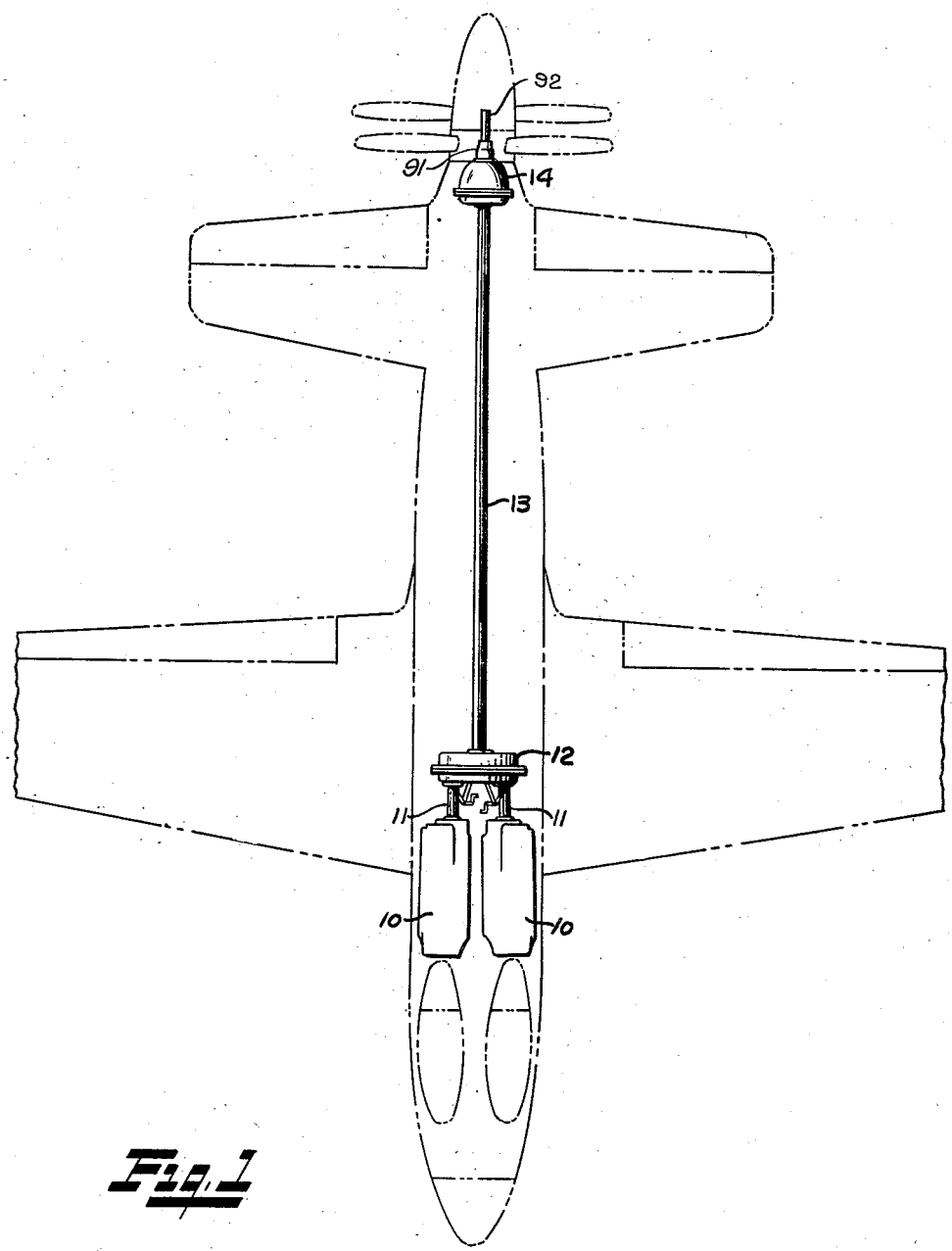
Figure 1 is a plan view showing the present transmission incorporated in a high speed, multi-engined airplane, having contra-rotating pusher propellers mounted with single-sense power input and interdependently driven, controlled and pitch changed in the tail.

The transmission system of the invention is illustrated in a high speed airplane in which a plurality of engines drive pusher type propellers mounted either dually or coaxially, at or near the tail of the craft, aft of an empennage. It will become apparent, however, that the invention can equally well be employed in connection with tractor type propellers located in the nose of the craft.

In all the embodiments illustrated, the invention broadly includes means near the engines for engaging them with, or disengaging them from, the transmission system; overdrive means for permitting the engines to either free-wheel or to synchronize automatically, these means being operative also to relieve one of the engines of the drag of a slower engine; change speed means for varying the ratio of torque to angular velocity in the transmission, and including a variable ratio reduction gear; and a substantially conventional, or fixed ratio, reduction gear means at or near the propeller end of the transmission system; at least one drive shaft connecting the propeller reduction gearing with the main gear box; means connecting the conventional reduction gearing to the propellers; and suitable control means for operating the engine-coupling means and the change speed gear.

A certain embodiment of the invention is particularly adapted for use with aft-mounted, contra-rotatable propellers having single-sense power input and interdependently driven and pitch-controlled, and the transmission system of this embodiment includes a gear box at the engine end of the system which incorporates a gear train for each engine. This train includes engine-coupling and decoupling means; free-wheeling means for eliminating the drag of an inoperative or slower engine and which also provide for engine synchronization and for starting one engine from another, the two gear trains being drivingly connected together at their aft ends; a conventional propeller reduction gear box at the propeller end of the system and including means for contra-rotating the propellers as though one propeller; a single shaft for drivingly connecting the latter gear box to the connected aft ends of the gear trains; and suitable control means for manually operating the engine engaging and disengaging means and the change-speed gear.

Another embodiment of the invention is particularly adapted for use with aft-mounted contra-rotatable propellers mounted in the tail with the only element in common being their axes, that is, being independently driven and pitch-controlled and having power input in two senses, and the transmission system of this embodiment includes a gear box at the engine end of the system which incorporates a gear train for each engine that is substantially identical with the previously mentioned one. The operatively connected aft end of each of these gear trains is drivingly connected to the conventional propeller reduction gearing for the propellers by an individual drive shaft, and each drive shaft incorporates means for disengaging and re-engaging the propeller reduction gearing with respect to the main transmission. This embodiment of the invention also contemplates the association with each of the propeller drive shafts of a conventional type of externally contracting brake, operable to immobilize a propeller drive shaft in case its propeller becomes inoperative, whereby to eliminate the drag of the shaft and idling propeller from the transmission system.

The invention also contemplates, in all or any of the embodiments thereof, that the crankshaft of each engine, at a suitable location along its rearward extension, be associated with a conventional type of manually or automatically operated braking means. By virtue of these means, in case an engine becomes completely disabled, its crankshaft can be completely immobilized. The free-wheeling device will infallibly be enabled to disconnect the inoperative engine and eliminate its drag on the transmission system.

In the embodiment illustrated in Figure 1, the construction includes twin engines 10 mounted in the fuselage of the airplane forwardly of the center of gravity thereof and just aft of the pilots' stations. Each engine has a crankshaft 11 extending rearwardly therefrom into a gear box 12. A single propeller drive shaft 13 extends from the aft end of the gear box 12 rearwardly of the airplane to a contra-rotational reduction gear box 14. The gear box 14 increases the torque and reduces the speed and transmits it to a pair of contra-rotating, pusher type independently mounted and driven propellers shown in phantom as extending from coaxial spinners. Referring now to Figure 3, the gear box 12 contains twin power transmitting trains 100. The outer side of each train is adapted to be engaged by the rearward, or driving end of one of the engine crankshafts 11, and the inner side of each train is adapted to drivingly engage with the propeller drive shaft 13. The general components of each train comprise, proceeding from the forward end to the rearward end: a clutch group 15 and a clutch operating group 16; a freewheel type of drive synchronizing the engine starting mechanism 17; and a change-speed, or variable ratio reduction gearing 18, all operatively interconnected, and transmitting power to the propeller drive shaft 13 as hereinafter described in detail.

The two gear trains are identical, and it is hence necessary to describe only the leftward group in detail. The rearward portion of the leftward shaft 11, inside the gear box, rigidly bears two driving pinions 19 and 20 spaced longitudinally thereof. A sun gear shaft 21 is rotatably mounted horizontally in the gear box and freely rotatably supports an externally and internally toothed ring gear 22, substantially medially of its length, by means of bearings 23. Pinion 20 meshes with and engages external teeth 24 on the ring gear. A sun gear 25 is keyed to one end of the sun gear shaft and the other end of the shaft bears a driving pinion 26. Planet gears 50, mounted and driven as described hereinafter, mesh and engage with internal teeth 24a on ring gear 22.

A shaft 27 is mounted in the gear box to extend horizontally in alignment with sun gear shaft 21. Shaft 27 bears an externally toothed ring gear 28, freely rotatably mounted on the shaft by means of bearings 29. Driving pinion 19 meshes with and engages the teeth on the ring gear 28.

An override cam-wheel 30 is freely and rotatably mounted on shaft 27, concentrically with the ring gear 28, by means of bearings 31. The periphery of the wheel 30 is, for a portion of its axial extent, of polygonal contour 30a, Figure 4. Normally lying between the sides of the polygon and the adjacent circular wall of the ring gear, but movable on occasion to a position between this wall and the apices of the polygon, are a plurality of free-wheeling rollers 32. The forward face of the wheel is provided with a conical seat 33. Splined, or otherwise slidably mounted on the shaft 27, is a double-coned clutch 34, having conical operating faces 35 and 36. The conical face 35 is adapted to be seated in seat 33 and the conical face 36 is adapted to be seated in a conical abutment 37 on the gear box casing, on respective occasions, by means of a shift group including a collar 38 having one end 39 fitted over the hub of the clutch and spaced therefrom by bearings 40, the other end of the collar being supported on shaft 27 by bearings 41. The actuator group also includes a shift lever 42, terminating at its forward end near a pilot's station. Between the inner end of this lever and the abutment provided by the gear box casing is interposed a fulcrum link 43, pivotally mounted at both ends; and between the inner end of lever 42 and the clutch collar is interposed a link 44, pivotally mounted at each end.

The rearward end of shaft 27 bears a spider 45, having any desired number of arms 46 and the outer end of each arm is formed as a hub 47 for rotatably supporting a stub shaft 48 in bearings 49. Each such shaft terminates rearwardly in one of the aforementioned planet gears 50, meshing with and engaging the internal teeth 24a on ring gear 22 and adapted to engage the teeth on the sun gear 25.

Driving pinion 26 meshes with and engages a driven pinion 51 keyed on propeller drive shaft 13. A similar driving pinion 52, rearwardly terminating the rightward gear train that includes a similar clutching, free-wheeling and gear ratio changing group associated with the rightward shaft 11, meshes with and engages the other side of the driven pinion 51.

Normally, that is during high speed flight, shift lever 42 occupies a position such that the apex of the links 43 and 44 occupies the position "A," Figure 3. The clutch 34 is hence in engagement with abutment 37, immobilizing shaft 27 and spider 45. The planetary gear shafts 48 hence rotate in hubs 47, and the ring gear 28 freewheels at this juncture. Pinion 20 rotates ring gear 22 freely on shaft 21, causing the internal teeth of this gear 22 to rotate the planetary gears 50. The planetary gears in turn rotate the sun gear 25, thereby rotating driving pinion 26. This pinion drives driven pinion 51 and propeller drive shaft 13 at a given speed and power ratio.

In this relative disposition of the parts, pinion 19 is driving ring gear 28, and free-wheeling rollers 32 and cam wheel 30 are locked together and rotate freely around shaft 27. They hence idle and perform no functions at this juncture.

Thus, the correct gear ratio for normal high speed flight is provided and in addition there is provided a direct connection of both engine crankshafts 11 to the propeller drive shaft 13. The latter feature maintains a desirable fly-wheel action when the engines are throttled back, as when approaching a landing. By virtue of this direct connection, however, the engines are always available for immediate acceleration.

The rear end of shaft 13 passes into a conventional reduction gear box 14, of the type such as that shown in United States Patent No. 2,380,889 to C. R. Waseige, or its equivalent. The propellers are mounted on, in effect, a common bearing or in such a manner that they cannot be independently controlled or feathered. Their hub shafts 91 and 92 are concentric, and each shaft passes forwardly into this gear box and bears, in the conventional manner, suitable separately driven pinions suitably separately driven at the desired gear ratio by the reduction gear in the gear box.

In order to effect an increase in the torque transmitted to the propellers, as to achieve optimum take-off performance, the shift lever is urged inwardly into position "C," Figure 3. The link 44 then urges the clutch 34 into engagement with the cam wheel 30. Hence, pinion 19 thereafter drives the ring gear 28, free-wheeling rollers 32, cam wheel 30, and clutch 34, to shaft 27. The spider 45 is hence caused to rotate, and, in turn, revolves all the planetary gears about the sun gear 25 and rotates each planetary gear about its own center while so revolving. The epicyclic relationship thus established effects a change in the gear ratio of the power transmission and in fact increases the torque while lowering the angular velocity, thus establishing the optimum condition for take-off.

By virtue of this construction, also, if the power of either engine should fall or fail, so that if the rightward shaft 11, say, and the driving pinions 19 and 20 thereon decrease in angular velocity, or even if they cease to rotate, sufficient power to rotate both propellers can nevertheless continue to be transmitted to both the propellers by the other engine. This operation is effected by causing the gear train between the inoperative shaft 11 and the driving pinion 52 to free-wheel. To this end, pinion 51, driven by the driving pinion 26 of the other gear train, will now drive pinion 20, which in turn, through shaft 21, rotates sun wheel 25. Since pinion 20 is idling, or at least not rotating under its own power, ring gear 22 is held stationary. Each of the planet gears is hence rotated about its own center by the sun gear and is also revolved about the center of the sun gear. The spider 45 is hence rotated, since clutch 34, is, in this position of the shift linkage, engaged to cam wheel 30. Thus, even though the ring gear 28 is not now being driven by the now idling pinion 19, the cam wheel 30 will free-wheel by virtue of the position of the rollers.

The inoperative engine, shaft 11, and pinions 19 and 20 will thus have no effect on the free transmission of power from the other engine to the propellers.

If either engine should develop trouble during flight, with the shift lever 42 in position "A," the lever can be immediately urged into position "B," Figure 3, in order to disengage the failing engine from the transmission. The clutch 34 is thereby positioned intermediate the seat 33 and the abutment 37, being hence in engagement with neither the cam wheel 30 nor the abutment 37. The shaft 27 and spider 45 hence idle freely, terminating the connection of the failing engine to the propeller drive shaft 13. Its braking effect, or drag, on the power supply, is hence eliminated.

To meet the contingency that either engine may become completely disabled, to such an extent that it cannot be repaired during flight, conventional shaft braking means, not shown, may be incorporated in the transmission and associated with each engine shaft 11. These means may be operated either manually or automatically to completely immobilize the associated shaft, whereby to totally eliminate the drag of the "dead" engine from the transmission system.

Referring again to Figure 3, and considering the problem of synchronizing the two engines, if the leftward engine, for example, should happen to suddenly increase its rate of revolution, the sudden torque generated thereby will accelerate the rotation of the ring gear 22, the inertia of the cam wheel 30 of the free-wheeling device holding the wheel relatively stationary. Hence, the rollers 32 will be shifted from this position between the apices of the cam wheel and the outer periphery of the ring gear, to positions lying between the sides of the wheel and the inner periphery of the ring gear, causing shaft 27 to idle. This shaft hence ceases to drive the planetary and sun gears and hence the driving pinion 26 will idle. This condition will prevail until the accelerated engine slows down to the speed of the other engine, whereupon the inertia of ring gear 22 will effect movement of rollers 32 into positions between the apices of the cam wheel and the inner periphery of the ring gear. Normal driving connection between the planet gears and the sun gear will hence be re-established, with the result that the driving pinion 26 will again add its driving force to the propeller shaft driven pinion 51.

The aim of enabling a dead engine to be started from an operating engine is accomplished in the following manner: ordinarily clutch 34 rotates free of either clutch abutment. With, say, the leftward engine inoperative, pinion 51 is driven by pinion 52 of the operative rightward engine, and in turn drives shaft 21, and then the sun and planetary gear train drives shaft 27. When clutch 34 is pressed against seat 33, ring gear 28 is caused to rotate and in turn rotates pinion 19 and shaft 11. This clutching action thus imparts rotation to leftward engine shaft 11, and if its ignition circuit is in closed condition, starts the leftward engine. Thus, it is not necessary to employ a starter for one engine, say the leftward engine. Either engine can be started from the operating one, on the ground or during flight.

It is manifest that if one of the power transmission gear trains should suffer a structural or mechanical failure and become inoperative, this will have no consequential effect upon the other power transmission gear train. Thus, unless both trains become inoperative simultaneously, power will be supplied to both of the propellers, or to the one that is operative if the other one has become inoperative.

Figure 2:
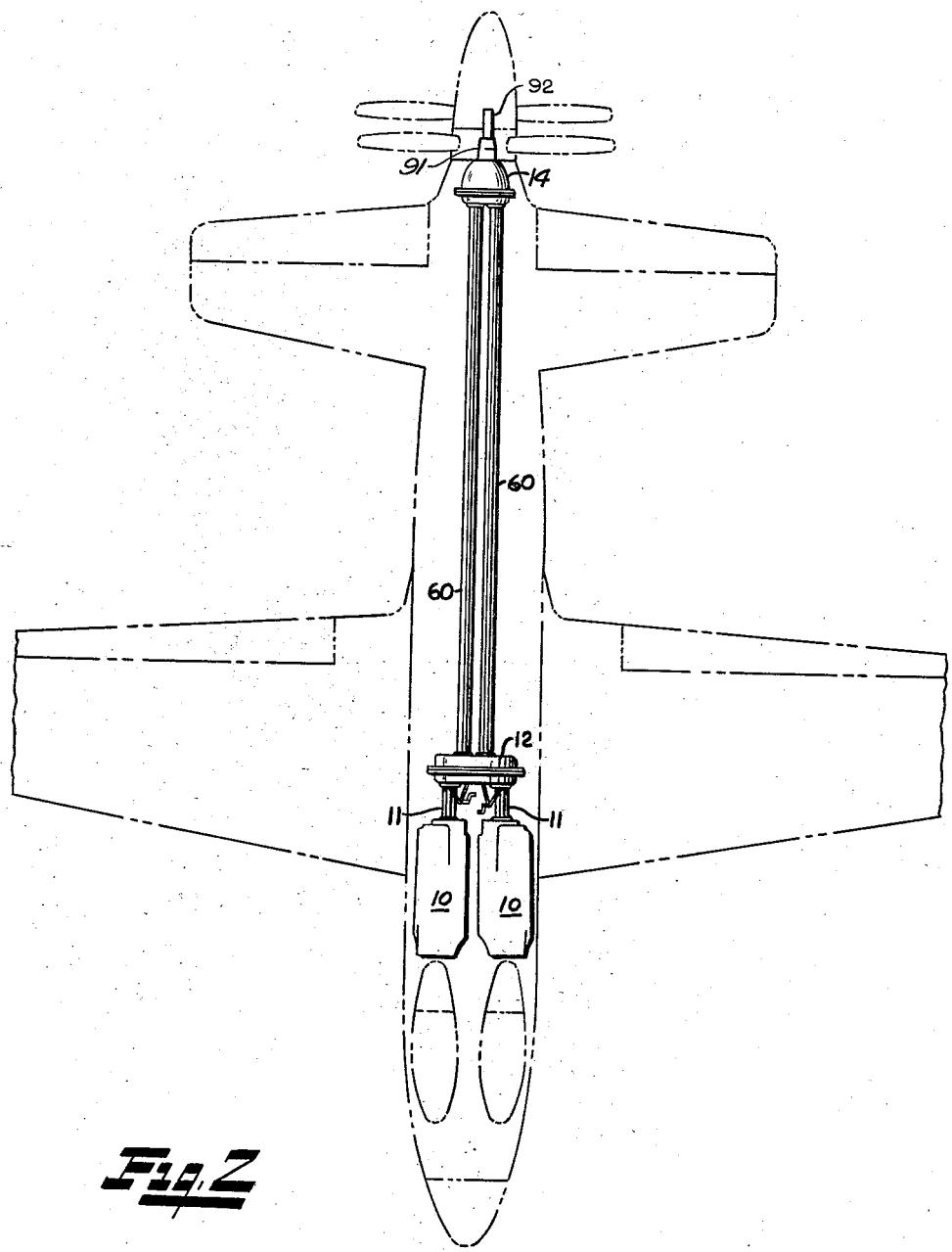
Figure 2 is a similar view of a similar type of airplane, showing another embodiment of the present transmission, employed with contra-rotating pusher type propellers mounted with two-sense power input and independently drivable and pitch-controllable in the tail of the aircraft.

The embodiment shown in Figure 2 is essentially the same as that of Figure 1 insofar as the power sources, the engine shafts 11, and the instrumentalities contained in the gear box 12 are concerned. The transmission system of Figure 2, however, being intended for use with independent, contra-rotating propellers mounted on separate bearings and independently adjustable, includes a drive shaft 60 for each propeller. The forward end of the leftward shaft 60 is drivingly connected to the rearward end of the shaft 21 of the leftward transmission gear train and the forward end of the other shaft 60 is similarly connected to the shaft 21 of the rightward train. The pinion 51 of Figure 1 is retained, in its order to permit synchronization but its previously associated shaft 13 is of course omitted. A conventional propeller reductiton gearing of the type disclosed in United States Patent No. 2,312,624 to Caldwell, or its equivalent, is also provided and is contained in box 14. The shafts 91 and 92 of the propellers lead forwardly into this gear box and are driven oppositely at the desired gear ratio, by suitable gears therein, in the conventional manner. The engine shafts also may include the separate shaft braking means, not shown, referred to in connection with the embodiment of Figures 1 and 3.

Figure 6:
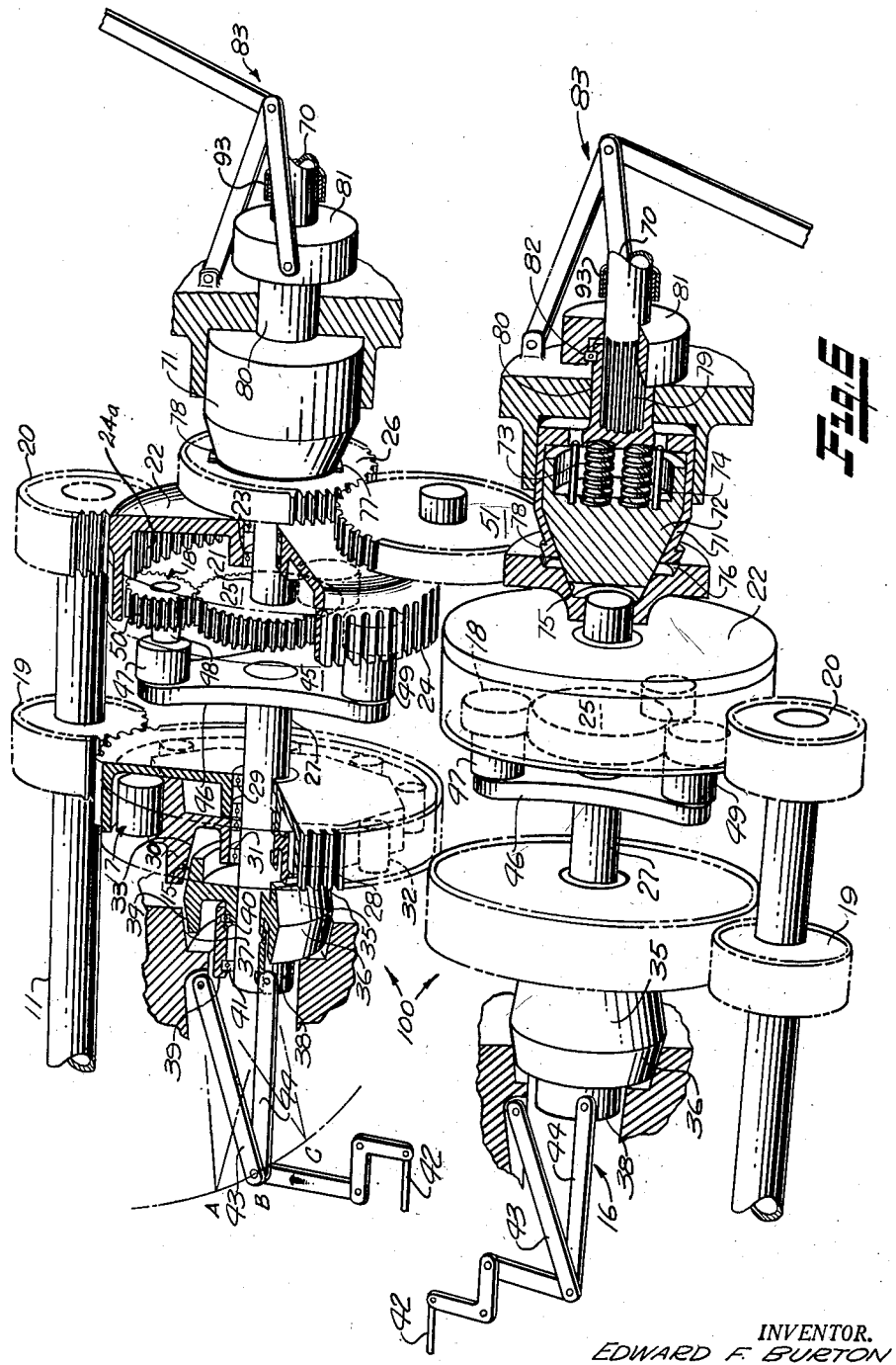
Figure 6 is a view similar to Figure 3, but including the propeller engaging and disengaging clutch means of Figure 5.

In the embodiment shown in Figures 5 and 6, either of the independently mounted, independently controllable propellers can be disengaged in flight from the transmission and fully feathered to prevent windmilling thereof. Each propeller can thereafter be restored to normal pitch, or blade incidence, and reconnected to the propulsion system with the same blade passage pattern it had before it was disconnected and feathered.

To this end, each propeller drive shaft 70, is provided, at the end adjacent the main gear box 12, with a clutch device 90. As shown in Figure 6, each clutch comprises two concentrically mounted conical members 71 and 72. Member 72 constitutes a forward cone slidably mounted inside the other, or rearward cone 71, the latter being slidably mounted in the aft wall of the gear box 12. A spring group 73 is interposed between the two cones to restrain movement of cone 71 with reference to cone 72, and to aid in the reverse movement of cone 71. Stabilizing pins 74 are anchored at one end to cone 72 and seated at the other end in cone 71, and serve to prevent relative rotation of the cones.

The rear face of each of the driving pinions 26 and 52 is provided with concentric conical seats 75 and 76, in which the forward cone and the rearward cone are, respectively, adapted to be seated. Seat 76 bears, at two diametrically opposed points on its peripheral wall, slots 77, and the periphery of the rearward cone bears complementary teeth 78, adapted to engage in these slots.

Shafts 70 not being longitudinally movable, means are provided for effecting engagement and disengagement of the clutch components and comprise a splined connection 79 between shaft 70 and the hub 80 of rearward cone 72. A sleeve 81 is mounted on the hub by a bearing 82, and this sleeve is actuated and de-actuated by a linkage system 83, substantially of the same construction and operation as the clutch operating system 16.

The location of teeth 78 and slots 77 are predetermined in such manner as to permit a propeller shaft 70 that has been disengaged for feathering, to be reconnected into the transmission with exactly the same blade passage pattern, with reference to the other propeller, that it had before it was disconnected from the transmission.

Each propeller drive shaft 70 may also be equipped with conventional externally contracting brakes, indicated diagrammatically at 93, and manually or automatically operable to completely immobilize its associated propeller drive shaft in the event that the propeller thereon becomes inoperative.

Various refinements in the particular constructions disclosed are contemplated by the invention, and all lie within the scope of the accompanying claims.

We claim:

1. In means for transmitting power from a plurality of engines, each having a drive shaft, to at least one propeller having a propelling shaft, the combination of: driving means longitudinally spaced on each of said drive shafts; means operatively associated with the forward one of said driving means, and including a shift lever for positively engaging and disengaging the prime mover with respect to the propelling shaft; free-wheeling prime mover synchronizing means interposed between the forward one of said driving means and said propelling shaft; change speed means operatively associated with the rearward one of said driving means; and means forming an operative part of the aforedescribed clutch means and extending operatively therefrom to also form an operative part of said change speed means for operatively connecting the change speed means with the shift lever.

2. In means for transmitting power selectively and collectively from a plurality of prime movers having drive shafts, to a plurality of propelling means, selectively and collectively, having driven shafts, the combination of: driving means longitudinally spaced on each of said drive shafts; at least one propelling shaft, and a driving connection between the rearward one of said driving means and said propelling shaft, the first-mentioned driving means including means for positively engaging and disengaging the prime mover from the propelling means and including free-wheeling means for synchronizing the prime movers; the said driving connection including change speed means.

3. In a multi-engine aircraft, power transmission means for starting one engine from the operating engine, comprising: power transmission gear train means extending from the crankshaft of each engine and including means normally driving the gear trains, the gear trains being drivingly connected at their ends remote from the engines; and, in at least one of the connected gear trains, free-wheeling means interposed between said adjacent ends and said normally driving means and clutch means adapted to be operated to cause the free-wheeling means to cease free-wheeling so as to cause it to drive said normally driving means to effect starting of its engine.

4. In a multi-engine aircraft, including twin driving means on each engine crankshaft, at least one propeller shaft, and a gear train operatively interposed between each said driving means and said propeller shaft, means in each gear train for varying the ratio of power transmission, comprising: a driven gear on the propeller shaft; a lay shaft; a driving gear thereon; an internally and externally toothed ring gear loosely mounted on said lay shaft and adapted to be driven by one of said driving means on said crankshaft; a sun gear rigidly mounted on said lay shaft concentric with said ring gear; planetary gears interposed between said sun gear and said internal teeth; a spider for supporting said planetary gears; and means respectively connectible and disconnectible to the other of said driving means and to said spider to thereby respectively cause said planetary gears to move only about their axes and drive said sun gear at a low speed and high power ratio; or to cause both to rotate about their axes and revolve around said sun gear to thereby drive said sun gear at high speed and low power ratio.

5. Means for transmitting power selectively and collectively from a plurality of prime movers having drive shafts to a plurality of propelling means, selectively and collectively, having driven shafts, comprising: driving gear members longitudinally spaced on the rearward end of each of said drive shafts; a first lay shaft; a propeller shaft drivenly connected to one end thereof, an externally and internally toothed ring gear loosely mounted on said lay shaft intermediate the ends thereof; one of said driving gear members driving a sun gear fixedly mounted on the other end of said lay shaft; a second lay shaft aligned with the first lay shaft; a spider on the rearward end of the latter lay shaft; a shaft bearing at the outer end of each arm of the spider; a stub shaft mounted in the bearing by one end and carrying a planet gear at the other end, each of said planet gears meshing with and engaging the internal teeth on said ring gear and the teeth of said sun gear; an externally toothed ring gear loosely mounted on said second lay shaft intermediate the ends thereof, the forwardly located driving member on said drive shaft meshing and engaging with said ring gear; a polygonal override cam wheel mounted on the same shaft interiorly of and concentrically with said ring gear; rollers normally disposed between the apices of said cam wheel and the inner periphery of said ring gear; a double-coned clutch member slidably mounted on said second lay shaft; a clutch actuating sleeve mounted on the forward end of said second lay shaft and adapted to actuate and de-actuate said clutch; and a shift lever linked to said sleeve; same on said lay shaft.

6. In a multi-engine, contra-rotating propeller driven aircraft: a power transmission system operatively interposed between the engines and the propeller shafts and comprising a drive shaft extending from each engine towards said propeller shaft; driving means longitudinally spaced on each drive shaft; a gear train operatively interposed between said driving means and the propeller shafts and drivenly connected at its input end to said driving means, the gear trains being disposed between, parallel to, and non-coaxially with, said drive shafts and operatively connected only at their output ends; and clutch means disposed out of the line of power transmission in each offset gear train; whereby both propellers can be driven concurrently in opposite directions by either engine, either engine can drive either propeller, and one propeller can be driven by both engines.

7. In a multi-engine, contra-rotating propeller driven aircraft: a power transmission system operatively interposed between the engines and the propeller shafts and including a drive shaft extending from each engine towards the propeller shafts; driving means longitudinally spaced on each drive shaft; a gear train operatively interposed between each driving shaft and the propeller shafts and drivenly connected at its input end to said driving means, the output ends of said gear trains being operatively interconnected; and means at the output end of each gear train operative from the input end of said train both automatically and manually for varying the ratio of power transmission to said propeller shafts from a relatively high torque, low angular velocity condition to a relatively low-torque, high angular velocity condition, whereby to provide said propellers with relatively high power and torque for takeoff and to provide same with high angular velocity for high speed performance.

8. In a multi-engine, contral-rotating propeller driven aircraft: a power transmission system operatively interposed between the engines and the propeller shafts and comprising a drive shaft extending from each engine towards said propeller shafts; driving means longitudinally spaced on each drive shaft; a gear train operatively interposed between each drive shaft and drivenly connected at its input end to said driving means, the gear trains being operatively interconnected at their output ends; and engine-driven, overdrive type free-wheeling means disposed at the input end of each gear train and operatively interposed between the forward one of said driving means and the propeller shafts; whereby to enable freeing the transmission system from either engine when its operation lags and thus relieve the other engine, the transmission, and the propellers of the drag of the lagging engine.

9. In a multi-engine, contra-rotating propeller driven aircraft: a power transmission system operatively interposed between the engines and the propeller shafts and comprising a driving shaft extending from each engine towards the propeller shafts; driving means longitudinally spaced one each drive shaft; a gear train operatively interposed between each driving shaft and the propeller shafts and drivenly connected at its input end to said driving means; and engine driven overdrive - type free - wheeling means in each gear train adapted automatically to respectively connect the gear train to said driving means on said shaft when the engine associated with that gear train is operating at the same speed as the other engine, and to disconnect said gear train from its engine when its engine is operating at a lower speed than said other engine so as to cause the propeller shafts to rotate always at the same synchronized angular velocities; whereby to co-phase the blade passage patterns of the propellers at all times.

10. In a multi-engine contra-rotating propeller driven aircraft: a power transmission system operatively interposed between the engines and the propeller shafts and comprising a drive shaft extending from each engine toward the propellers; driving means longitudinally spaced on each drive shaft; a gear train operatively interposed between each driving shaft and the propeller shafts and drivenly connected at its input end to said driving means, the output ends of said gear trains being operatively inter-connected; and a clutch operatively interposed in the train of drive at the output end of each gear train between same and the respective propeller shaft; whereby each propeller may be disconnected from the system and feathered to obviate wind-milling thereof.

EDWARD F. BURTON.
CHARLES S. GLASGOW, Jr.

REFERENCES CITED

The following references are of record in the file of this patent:

UNITED STATES PATENTS

| Number | Name | Date |
|---|---|---|
| Re. 15,550 | Zimmermann | Feb. 27, 1923 |
| 1,019,283 | Surcouf | Mar. 5, 1912 |
| 1,456,008 | Nuanes | May 22, 1923 |
| 1,540,610 | Desmoulins | June 2, 1925 |
| 1,696,836 | Bushyager | Dec. 25, 1928 |
| 1,747,334 | Sundstedt | Feb. 18, 1930 |
| 1,899,490 | Wiedmann | Feb. 28, 1932 |
| 1,969,993 | Schmidt | Aug. 14, 1934 |
| 1,971,846 | Bauer | Aug. 28, 1934 |
| 2,042,168 | Campbell | May 26, 1936 |
| 2,140,324 | Lydholm | Dec. 13, 1938 |
| 2,152,552 | Lindstrom | Mar. 28, 1939 |
| 2,297,214 | Gosslau | Sept. 29, 1942 |
| 2,310,220 | DeMichelis | Feb. 9, 1943 |
| 2,312,624 | Caldwell | Mar. 2, 1943 |
| 2,380,889 | Waseige | July 31, 1945 |
| 2,389,778 | Fedden et al. | Nov. 27, 1945 |
| 2,396,745 | Nallinger et al. | Mar. 19, 1946 |
| 2,456,485 | Bendix | Dec. 14, 1948 |

OTHER REFERENCES

"Aviation News," March 19, 1945 page 23.
Ser. No. 330,322, Nallinger (A. P. C.), published May 18, 1943.